(No Model.) 2 Sheets—Sheet 1.

O. K. NEWELL.
BICYCLE SEAT.

No. 575,509. Patented Jan. 19, 1897.

WITNESSES.
Matthew M. Blunt
J. Murphy

INVENTOR.
Otis K. Newell
by Jas. H. Churchill
ATT'Y (No Model.)  2 Sheets—Sheet 2.
O. K. NEWELL.
BICYCLE SEAT.

No. 575,509. Patented Jan. 19, 1897.

WITNESSES.
Matthew M. Blunt
J. Murphy

INVENTOR.
Otis K. Newell
by Jas. H. Churchill
ATT'Y

UNITED STATES PATENT OFFICE.

OTIS K. NEWELL, OF BOSTON, MASSACHUSETTS.

BICYCLE-SEAT.

SPECIFICATION forming part of Letters Patent No. 575,509, dated January 19, 1897.

Application filed July 16, 1896. Serial No. 599,379. (No model.)

*To all whom it may concern:*

Be it known that I, OTIS K. NEWELL, residing in Boston, in the county of Suffolk and State of Massachusetts, have invented an Improvement in Bicycle-Seats, of which the following description, in connection with the accompanying drawings, is a specification, like letters and figures on the drawings representing like parts.

This invention relates to a seat for bicycles, and has for its object to provide a seat in which the rider sits and is supported in such manner as to relieve all middle flesh or perineum from pressure, thereby obtaining an easy-riding, safe, and anatomically-correct bicycle-seat.

In accordance with this invention the seat is composed of a rim or open frame suitably shaped at its back portion to embrace the buttocks of the rider and further provided with inwardly-extended arms at the front portion, which arms are separated to avoid contact with the middle flesh or perineum of the rider. The inwardly-extended arms, for the best results, are also slightly inclined upward, so as to offer a resistance or stop to any tendency of the rider slipping forward out of the seat, by the impingement of the anterior aspect of the ischial tuberosities and the muscles and other soft parts covering them, against the said arms. The rim-seat referred to may be spring-supported in any desired or suitable manner, but preferably by one or more springs, which may be made of wire rods suitably fastened to the back of the seat and preferably extended to the inwardly-projecting arms, as will be described. The rim-seat, when made of metal, as preferred, may be provided with a suitable covering of felt, leather, or other suitable or desired material. These and other features of this invention will be pointed out in the claims at the end of this specification.

Figure 1:
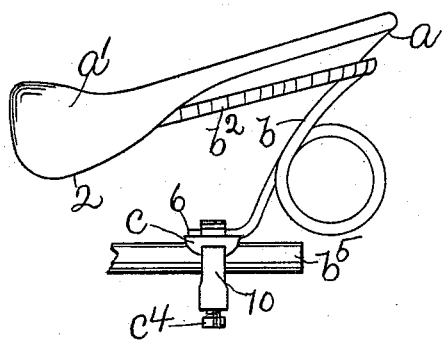
Figure 2:
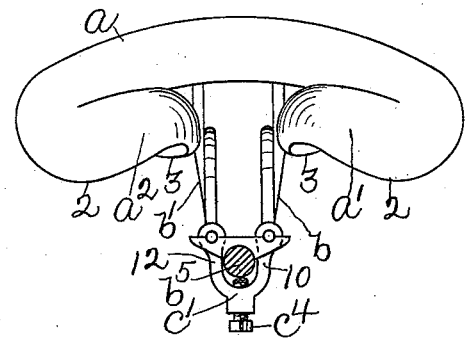
Figure 3:
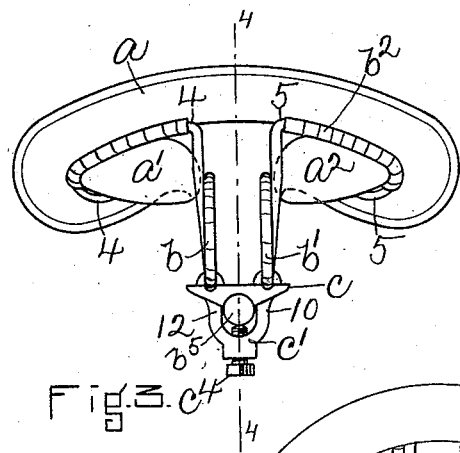
Figure 4:
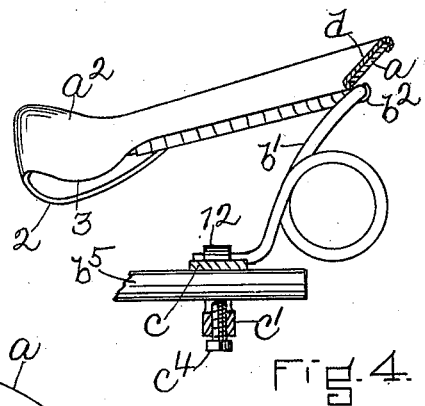
Figures 5, 6, 7:
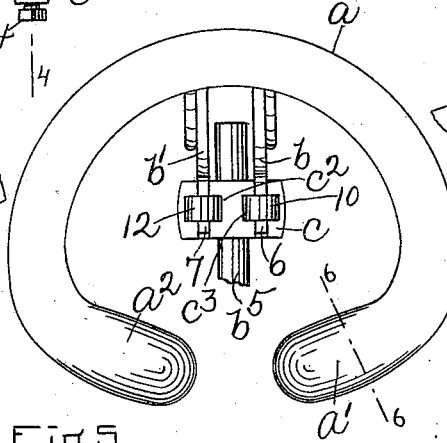
Figure 7:
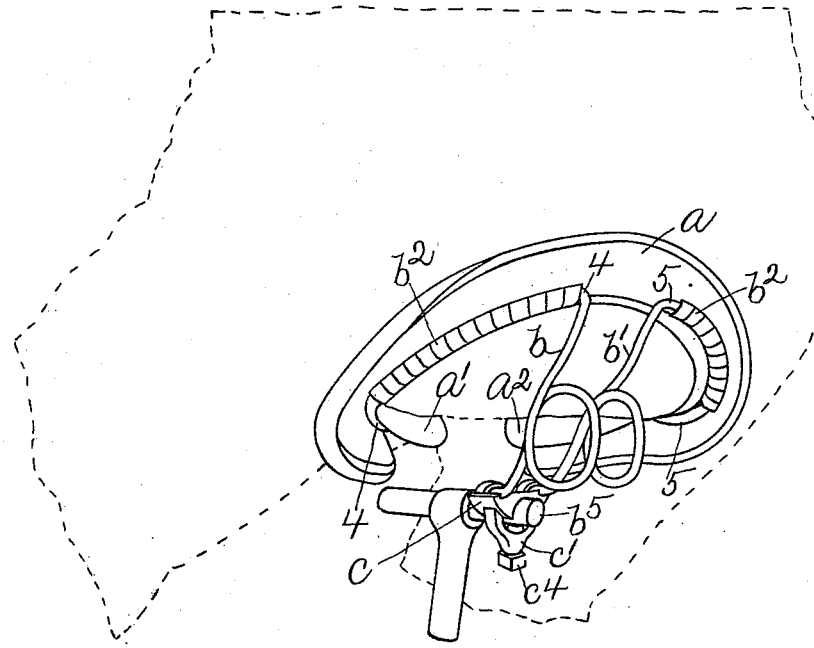
Figure 8:
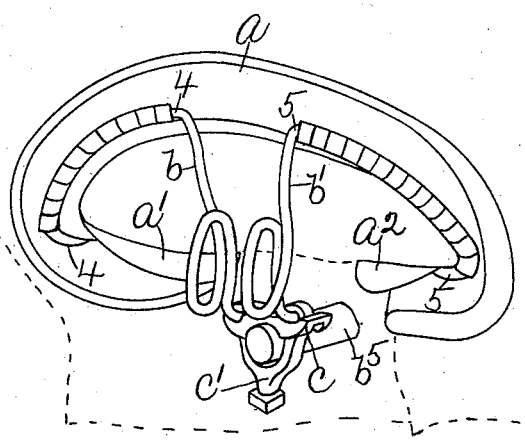

Figure 1 is a side elevation of a bicycle-seat embodying this invention; Fig. 2, a front elevation of the seat shown in Fig. 1, looking toward the right; Fig. 3, a rear elevation of the seat shown in Fig. 1, looking toward the left; Fig. 4, a section on the line 4 4, Fig. 3; Fig. 5, a top or plan view of the seat shown in Fig. 2; Fig. 6, a sectional detail on the line 6 6, Fig. 5; Figs. 7 and 8, rear views of the bicycle-seat with a sufficient portion of the figure of a rider thereon to more clearly illustrate the invention, and Figs. 9 and 10 modifications to be referred to.

The bicycle-seat herein shown as embodying this invention consists, essentially, of an open frame or rim composed of a back portion $a$ and a front portion comprising two inwardly-extended arms $a'$ $a^2$, preferably integral with the said back portion. The back portion $a$ is suitably shaped to fit or embrace the buttocks of the rider, as represented in Figs. 7 and 8, and the said back portion is preferably made substantially circular or arc-shaped, and the arms $a'$ $a^2$ are extended inward from the ends of the said back portion, and preferably the said arms are upwardly inclined with relation to the ends of the arc-shaped back portion, (see Fig. 2,) so that when the seat is secured to the frame of the bicycle a hollow seat is obtained in which the rider sits, the back portion $a$ of the rim-seat inclining upward in one direction and the front portion or arms $a'$ $a^2$ inclining upward in an opposite direction, after the manner represented in Fig. 1. The arms $a'$ $a^2$ extend inward at an angle to a line tangent to the ends of the said back portion and substantially parallel with a line through substantially the center of the back portion $a$, as clearly shown in Fig. 5.

The open frame or rim may and preferably will be made of metal and formed in one piece, the inwardly-extended arms $a'$ $a^2$ being preferably made, as herein shown, by folding or bending the metal comprising each arm longitudinally, so as to form depending sides or members 2 3. (See Fig. 6.) The member or side 2 of each arm forms what may be termed the "front" side of the arm, and is carried downward and preferably backward, after the manner shown in Fig. 6, so that it is removed from the path of movement of the leg of the rider in the act of pedaling. The rear side or member 3 is preferably made inclined downward and backward, as represented in Fig. 6, so as to afford a substantially wide bearing or seat proper for the portion of the buttocks over the ischial tuberosity to rest against.

The inwardly-extended arms $a'$ $a^2$ in practice are designed to be made of suitable length to be engaged by the muscles and soft parts covering the ischial tuberosities, which is the proper part of the body to receive the pressure and blow, vibration, or shock incurred in riding, the middle flesh and other sensitive parts of the body being relieved from such pressure, vibration, or shock and consequently being relieved from danger of injury.

The rim-seat may be spring-supported in any suitable manner, and in the present instance it is shown as supported by springs made from wire rods $b$ $b'$, having their upper portions 4 5 curved or shaped to conform to the shape of the back portion $a$ (see Figs. 3, 7, and 8) and secured to said back portion by ears $b^2$, preferably integral with the back portion $a$ and bent or folded over the portions 4 5 of the wire springs. The lower portions 6 7 of the springs may be secured in any suitable or desired manner to a bar or rod $b^5$, which may be attached to or form part of the bicycle-frame, and the said lower portions of the springs may be provided with one or more coils or loops, or they may be left uncoiled. In the present instance the springs $b$ $b'$ are secured to the bar or rod $b^5$ by a fastening device consisting of a clip $c$, adapted to fit across the upper part of the rod $b^5$, and a yoke or fork-shaped piece $c'$, having its arms 10 12 adapted to extend up through suitable holes $c^2$ $c^3$ in the clip $c$ and to clamp the ends of the springs $b$ $b'$ between them and the said clip, the said yoke being adapted to be forced away from the rod $b^5$, so as to firmly clamp the springs between the upper end of its arms 10 12 and the clip $c$ by a set-screw $c^4$.

Instead of the particular form of fastening device herein shown, I may employ any other suitable form. It will be understood that the supporting-springs are so shaped and positioned that they do not make contact with the body of the rider when the latter is sitting in the seat A.

In Figs. 7 and 8 I have illustrated the mode of operation of the bicycle-seat, and by reference to said figures it will be seen that the body of the rider is firmly supported in the seat and is retained therein from slipping out by the rearwardly and downwardly inclined portions 3 of the arms $a'$ $a^2$, while at the same time the back portion $a$ of the seat forms a brace or support for the buttocks of the rider. Furthermore, it will be seen that the arms $a'$ $a^2$ do not interfere with the action of the legs in pedaling, and also it will be seen that the seat is open at its center and front, so that the sensitive middle flesh or perineum does not make contact with the seat, and consequently injury to the rider is avoided in this respect, which makes the bicycle-seat herein shown especially available for ladies.

In practice I prefer to make the rim-seat of sheet metal, with the arms $a'$ $a^2$ in one piece with the back portion $a$, and to extend the members 4 5 of the springs under the said arms, and the said arms being of substantially thin sheet metal and spring-supported have imparted to them a spring-like action, which permits the arms to yield on the downward movement of the leg of the rider and to ascend or follow the leg on its upward movement. In practice the rim-seat may be provided with a covering $d$, of felt, rubber, leather, or other suitable material, if desired. I have herein shown one angular relation between the back portion $a$ and the arms $a'$ $a^2$, which I believe to be best suited for the majority of riders; but I do not desire to restrict my invention to the precise relations shown.

Figure 10:
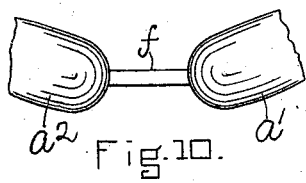

I may prefer to make the open frame or rim with the inwardly-projecting arms $a'$ $a^2$ disconnected, as shown in Figs. 1 to 8, inclusive; but I do not desire to limit my invention in this respect, as the said arms may be connected together by a tie-bar $f$, as shown in Figs. 9 and 10, which tie-bar is removed from contact with the middle flesh or perineum, and the bicycle-seat preserves its characteristic open frame adapted to be sat into by the rider, so that its rear portion embraces the buttocks of the rider, while its front portion is composed of inwardly-extended arms, over which the legs of the rider extend, as above described.

By reference to Fig. 9 it will be seen that the tie-bar $f$ is lowered away from possible contact with the rider.

In my improved bicycle-seat two things will be noticed from an inspection of the drawings, and especially Figs. 3, 7, and 8. First, it will be seen that the back portion of the rim-seat inclines downward from its upper edge toward the front of the seat, and, second, the inwardly-extended arms, constituting the front portion of the seat, incline backward and downward from the upper edge of the said arms toward the back portion of said seat. In other words, the rear portion of the rim-seat slopes downwardly in one direction toward the front of the seat, while the front portion of the rim-seat slopes downwardly in an opposite direction toward the rear of the rim-seat, so that if the two planes of the two distinct parts were extended they would intersect in a line between the front and rear portions of the rim-seat.

As a result of this construction the rim-seat, when adjusted to the bicycle-frame so that the front portion or arms $a$ $a'$ do not interfere with the leg action in pedaling, will assume substantially the position represented in Figs. 7 and 8 and the downwardly inclined or sloping rear portion will fit and embrace the buttocks of the rider and afford a brace for the back of the rider, while the rearwardly inclined or sloping front portion of the rim-seat will sustain the greater portion of the weight of the body and will afford a substantially wide bearing for the portion of the buttocks over or covering the seat-bones or ischial tuberosities.

I claim—

1. A bicycle-seat consisting of a frame or rim adapted to be sat into by the rider and comprising a back portion downwardly inclined toward the front portion of the seat to embrace the buttocks of the rider, and the said front portion consisting of arms extended inwardly from the back portion and downwardly and rearwardly inclined toward the rear portion of the said seat, substantially as described.

2. A bicycle-seat consisting of an open frame or rim adapted to be sat into by the rider, and comprising a back portion adapted to embrace the buttocks of the rider, and a front portion consisting of inwardly-extended arms separated at their adjacent ends and inclined rearwardly toward the said back portion to form a substantially wide bearing or seat proper when the legs of the rider are extended over the front edges of the said arms, substantially as described.

3. The combination with a bicycle-seat comprising a back portion downwardly inclined from its upper edge toward the front portion of the seat to embrace the buttocks of the rider, and the said front portion composed of inwardly-extended arms attached to the back portion and inclined downwardly and rearwardly from their upper edges over which the legs of the rider extend toward the back portion of the seat and separated at their adjacent ends, of springs secured to the back portion and having their free ends extended downwardly and under the center portion of the seat, substantially as described.

4. A bicycle-seat consisting of an open frame or rim adapted to be sat into by the rider and comprising a curved back portion $a$ to embrace the buttocks of the rider and form a brace for the back of the rider, and arms $a'$ $a^2$ extended inwardly and inclined rearwardly and downwardly from their upper edges to afford a substantially wide bearing for the seat-bones or ischial tuberosities to rest upon, substantially as described.

5. A bicycle-seat consisting of an open frame or rim adapted to be sat into by the rider and comprising a back portion adapted to embrace the buttocks of the rider, and a front portion consisting of inwardly-extended arms inclined rearwardly toward the said back portion to form a substantially wide bearing or seat proper for the seat-bones or ischial tuberosities to rest upon, substantially as described.

In testimony whereof I have signed my name to this specification in the presence of two subscribing witnesses.

OTIS K. NEWELL.

Witnesses:
   JAS. H. CHURCHILL,
   J. MURPHY.